United States Patent
Shinta et al.

(10) Patent No.: US 7,464,964 B2
(45) Date of Patent: Dec. 16, 2008

(54) VEHICLE FRONT BODY STRUCTURE

(75) Inventors: Masanori Shinta, Zama (JP); Daizou Miyata, Odawara (JP); Kenichi Yoshihara, Zama (JP)

(73) Assignee: Nissan Motor Co., Ltd., Kanagawa-Ken (JP)

(*) Notice: Subject to any disclaimer, the term of this patent is extended or adjusted under 35 U.S.C. 154(b) by 218 days.

(21) Appl. No.: 11/090,007

(22) Filed: Mar. 28, 2005

(65) Prior Publication Data

US 2005/0218645 A1 Oct. 6, 2005

(30) Foreign Application Priority Data

Apr. 6, 2004 (JP) ............... P2004-111969

(51) Int. Cl.
*B62D 21/00* (2006.01)
(52) U.S. Cl. ............... 280/784; 180/68.4; 280/124.109; 280/124.153; 280/797; 280/798
(58) Field of Classification Search ......... 280/784, 280/781, 796, 797, 798, 124.109, 124.153
See application file for complete search history.

(56) References Cited

U.S. PATENT DOCUMENTS

| | | | | |
|---|---|---|---|---|
| 2,751,992 A | * | 6/1956 | Nallinger ............... | 180/56 |
| 3,860,258 A | * | 1/1975 | Feustel et al. ............ | 180/312 |
| 4,943,081 A | * | 7/1990 | Golpe ................. | 280/124.109 |
| 4,943,092 A | * | 7/1990 | Haraguchi ............ | 280/124.109 |
| 6,578,904 B1 | | 6/2003 | Yvetot et al. | |
| 2003/0227165 A1 | * | 12/2003 | Herrmann et al. .......... | 280/781 |
| 2004/0104553 A1 | * | 6/2004 | Richardson .......... | 280/124.163 |
| 2004/0104568 A1 | * | 6/2004 | Tronville et al. ............ | 280/781 |
| 2005/0046165 A1 | * | 3/2005 | Gomi et al. .............. | 280/781 |
| 2005/0062251 A1 | * | 3/2005 | Ramsey ............... | 280/124.153 |
| 2006/0103127 A1 | * | 5/2006 | Lie et al. ................ | 280/781 |

FOREIGN PATENT DOCUMENTS

| | | |
|---|---|---|
| JP | 01-087944 | 6/1989 |
| JP | 9-169283 | 6/1997 |
| JP | 2003-095132 | 4/2003 |
| JP | 2003-160060 | 6/2003 |
| JP | 2003-291854 | 10/2003 |
| JP | 2004-058989 | 2/2004 |

OTHER PUBLICATIONS

Chinese Office Action for Corresponding Application No. 2005100648142 Issued Jan. 19, 2007.
Japanese Office Action, with English Translation, issued in corresponding Japanese Patent Application No. 2004-111969, issued on Sep. 18, 2007.

* cited by examiner

*Primary Examiner*—Eric Culbreth
(74) *Attorney, Agent, or Firm*—McDermott Will & Emery LLP

(57) ABSTRACT

A vehicle front body structure which includes: a longitudinal structural member provided at a front end thereof with a bracket which has a portion projecting downward from a lower side face of the longitudinal structural member; a transverse member connected to the longitudinal structural member at the bracket thereof; and a suspension member mounted to the longitudinal structural member with a front portion thereof fixed to the lower side face of the longitudinal structural member at a position in the vicinity of a rear side face of the downward projecting portion of the bracket.

6 Claims, 4 Drawing Sheets

7,464,964 B2

VEHICLE FRONT BODY STRUCTURE

BACKGROUND OF THE INVENTION

1. Field of the Invention

The present invention relates to a vehicle front body structure.

2. Description of Related Art

The Japanese Patent Application Laid-open Publication No. 9-169283 discloses a vehicle front body structure in which a pair of side members of a vehicle body extends in the vehicle longitudinal direction on both sides in the vehicle transverse direction. The front ends of these side members are connected by a radiator core support. Further to the front ends of the side members, a bumper armature (bumper beam) is connected with bumper stays provided therebetween.

In such a vehicle front body structure, a front suspension is connected to the side member, and a front mounting portion of the front suspension is mounted to the lower side face of the side member.

SUMMARY OF THE INVENTION

However, in the above-mentioned vehicle front body structure, the suspension member has a downwardly inclined section extending rearward from a front mounting portion thereof connected to the side member and a horizontal section extending rearward from the downwardly inclined section. There is no member provided in front of the front mounting portion of the suspension member, to prevent forward displacement of the front mounting portion relative to the side member.

When a collision load is inputted from the front of the vehicle at a frontal collision, as shown in FIG. 4, a moment M acts on an inclined section b1 of a suspension member a behind a front mounting portion b thereof with the front mounting portion b as the fulcrum. And the suspension member a is bent and broken, with the inclined portion b1 being rotated around the front mounting portion b, and an intermediate section c of the suspension member a moving downward. FIG. 4 also shows a side member d, a bumper stay e, a bumper armature f, and a radiator core support g.

Since the suspension member a is bent and deformed in the above-mentioned manner, the vehicle front body structure provides a small reaction force against the collision load, and a low efficiency of the impact energy absorption.

If a vehicle having such a structure collides against an object K deformable at a frontal collision, such as an automobile, the object K is deformed to have a front face PK thereof in a shape surrounding the front end of the side member d of the vehicle without providing a flattened portion therein. Thus, the collision load is not distributed uniformly in a wide range but concentrated on the front end of the side member d, and compatibility required for the vehicle front body is harmed.

The present invention has been made in the light of the problem. An object of the present invention is to provide a vehicle front body structure in which the efficiency of impact energy absorption by a suspension member is enhanced and the compatibility is improved, providing a wide flattened portion in the front face of the object.

An aspect of the present invention is a vehicle front body structure comprising: a longitudinal structural member provided with a bracket at a front end thereof, which has a portion projecting downward from a lower side face of the longitudinal structural member; a transverse member connected to the longitudinal structural member at the bracket thereof; and a suspension member mounted to the longitudinal structural member with a front portion thereof fixed to the lower side face of the longitudinal structural member at a position in the vicinity of a rear side face of the downward projecting portion of the bracket.

BRIEF DESCRIPTION OF THE DRAWINGS

The invention will now be described with reference to the accompanying drawings wherein.

DETAILED DESCRIPTION OF THE PREFERRED EMBODIMENT

An embodiment of the present invention will be explained below with reference to the drawings.

Figure 1:
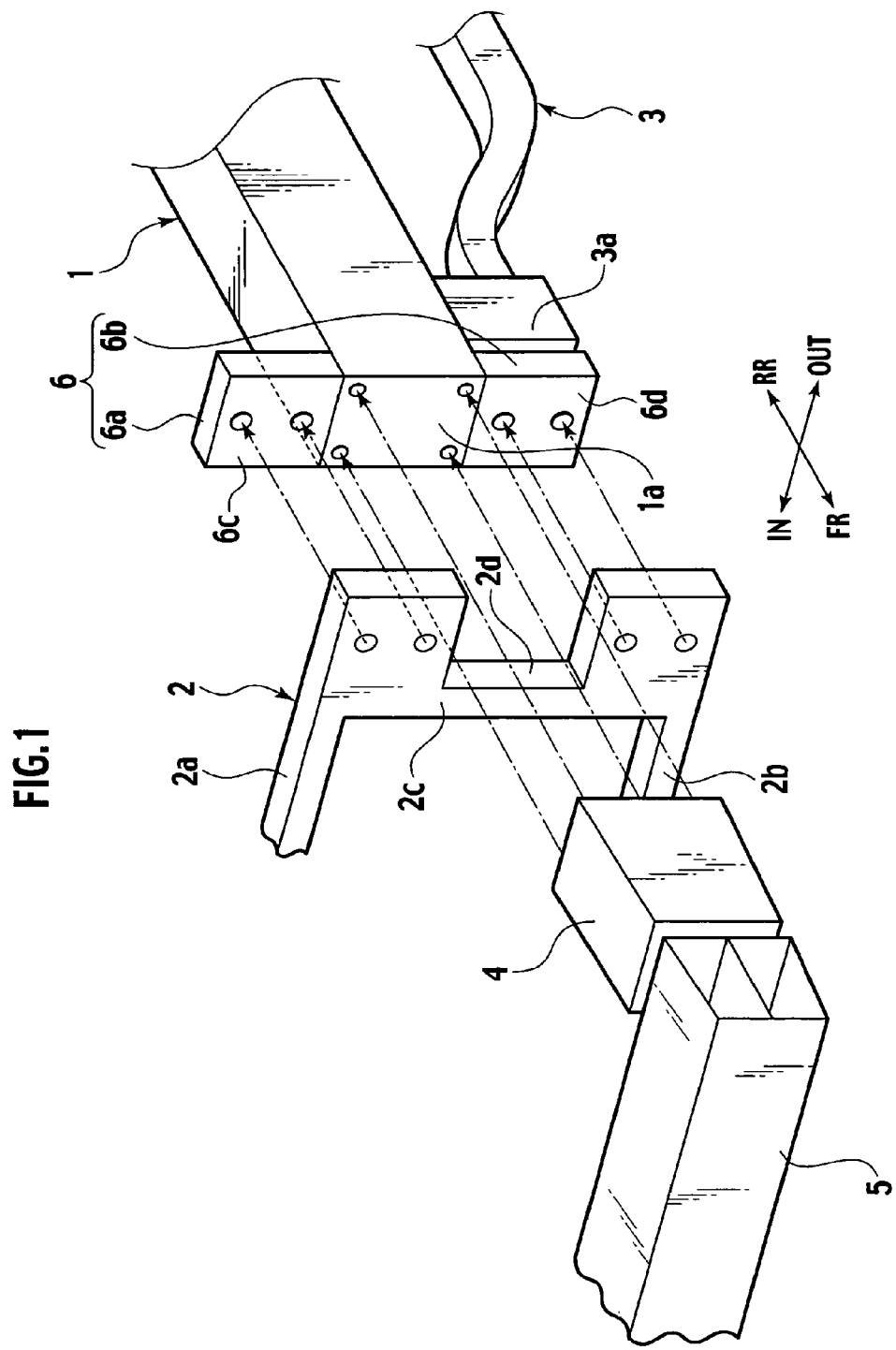
FIG. 1 is an exploded perspective view of a structural member of a vehicle front body according to an embodiment of the present invention.
Figure 2:
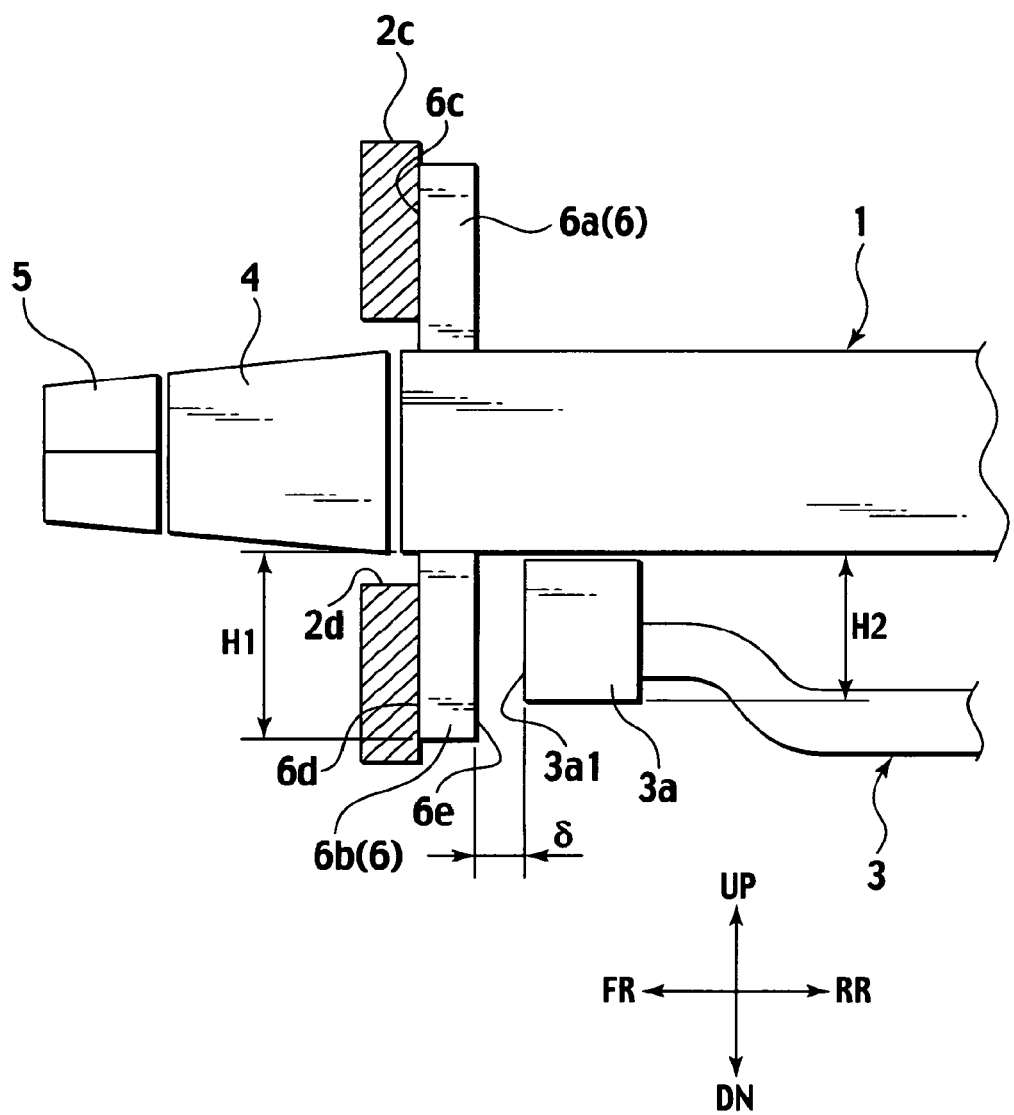
FIG. 2 is a side view of the structural member of the vehicle front body of FIG. 1.

A vehicle front body structure of the embodiment is provided with, as shown in FIGS. 1 and 2, a pair of right and left side members 1 (only left one is shown in this embodiment) extending in the vehicle longitudinal direction on both sides in the vehicle transverse direction in the vehicle front body as longitudinal structural members, a radiator core support 2 as a vehicle transverse directional member to be mounted across the front ends of the side members 1, and a suspension member 3 with the front mounting portions thereof mounted to the lower side faces of the side members 1 on the front ends thereof. A bumper armature 5 is connected to the front ends of the side members 1 with bumper stays 4 provided therebetween, respectively.

Each of the side members 1 is formed to have a closed sectional structure with a rectangular cross section, and is configured to absorb impact energy at a frontal collision by being crushed or axially deforming when an axial collision load is inputted.

The radiator core support 2 has an upper member 2a and a lower member 2b both extending in the vehicle transverse direction, and side stays 2c to connect both ends in the vehicle transverse direction of the upper and lower members 2a and 2b. A radiator, not shown, is mounted between the upper and lower members 2a and 2b. Each of the side stays 2c is mounted to the front end of the side member 1.

The suspension member 3 is connected to the vehicle body. The front mounting portion 3a thereof is connected to the lower side face of the side member 1. The front mounting portion 3a has a shock absorber therein to dampen the suspension vibration, allowing the suspension member 3 to move in the vertical direction relative to the vehicle body. The rear end of the suspension member 3 is connected to an extension side member of the vehicle lower body structural member.

The side member 1 is provided at the front end thereof with a bracket 6 which has an upward projecting portion (flange) 6a extending or projecting upward from the upper side face of the side member 1 and a downward projecting portion (flange) 6b extending or projecting downward from the lower side face thereof. The radiator core support 2 is connected to the side member 1 at the upward projecting portion 6a and the downward projecting portion 6b. The front mounting portion 3a of the suspension member 3 is connected to the lower side face of the side member 1 at a position in the vicinity of a rear side face of the downward projecting portion 6b of the bracket 6.

The upward projecting portion 6a of the bracket 6 is a rectangular plate welded to the upper side face of the side member 1 at the front end thereof. The downward projecting portion 6b is a rectangular plate welded to the lower side face of the side member 1 at the front end thereof. The upward projecting portion 6a and the downward projecting portion 6b are formed to have front side faces 6c and 6d, respectively, and are arranged to have the front side faces 6c and 6d being aligned with each other and substantially flush with a front side face of an end plate 1a which is provided at the front end of the side member 1.

The front mounting portion 3a of the suspension member 3 is formed to have a front side face 3a1 in substantially parallel with a rear side face 6e of the downward projecting portion 6b. A clearance δ (δ=10 mm) is provided, as shown in FIG. 2, between the front side face 3a1 of the front mounting portion 3a and the rear side face 6e of the downward projecting portion 6b. Also, the lower end of the rear side face 6e of the downward projecting portion 6b of the bracket 6 is positioned lower than the lower end of the front side face 3a1 of the front mounting portion 3a of the suspension member 3.

Also, the radiator core support 2 is connected to the side member 1 with the side stay 2c thereof connected to the bracket 6 using bolts, not shown. As shown in FIG. 1, the side stay 2c is provided with an opening 2d in a portion corresponding to the end plate 1a of the side member 1. The front side face of the end plate 1a is exposed through the opening 2d. The bumper armature 5 is connected to the side members 1 with bumper stays 4 provided therebetween, and is arranged in front of and in parallel with the radiator core support 2. The bumper stays 4 extend rearward from the rear side faces of the bumper armature 5 at both transversely outer ends thereof. The bumper stay 4 is directly connected to the end plate 1a at the front end of the side member 1 through the opening 2d of the side stay 2c.

Figure 3:
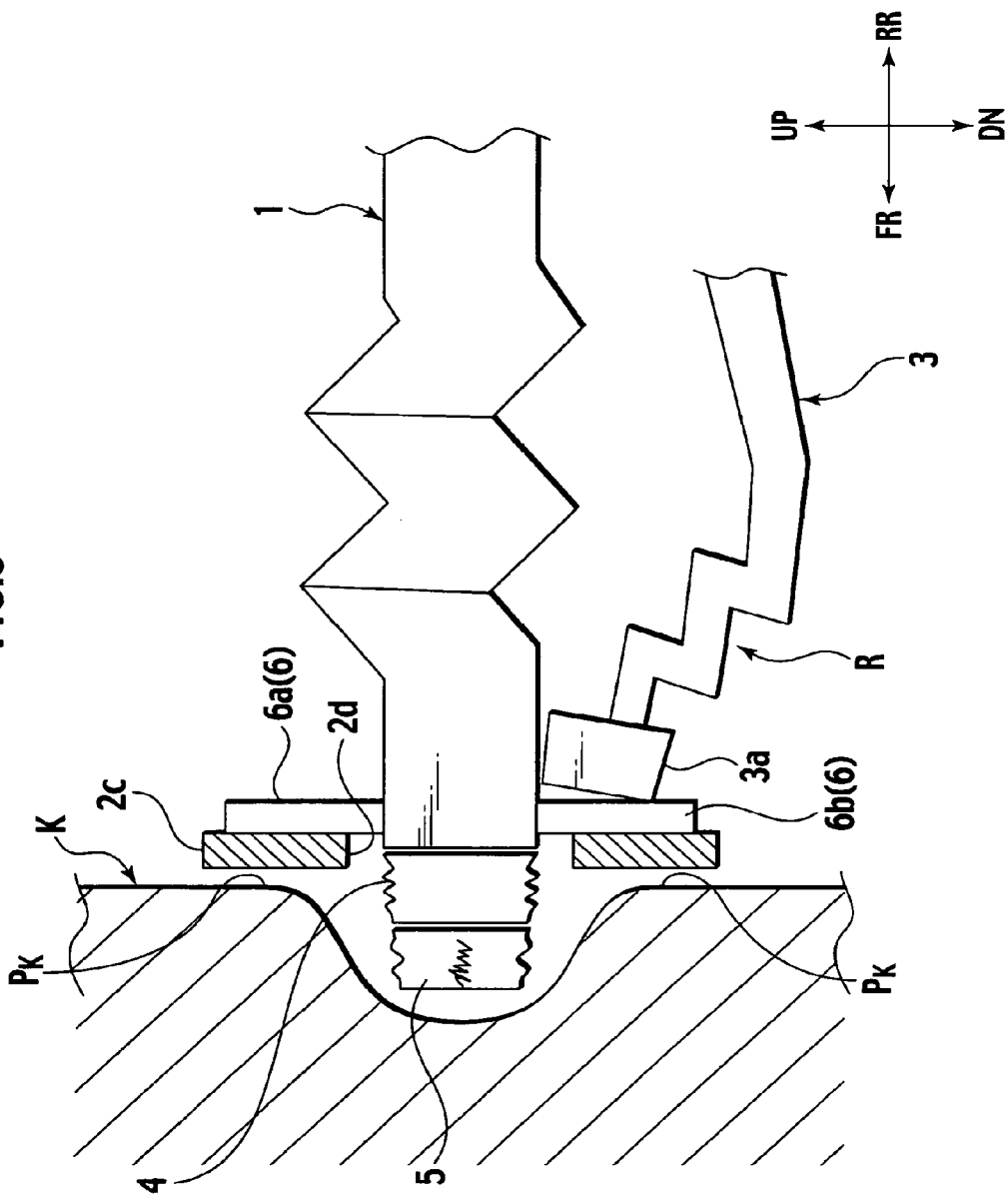
FIG. 3 is a side view showing deformation of the structural member of the vehicle front body of FIG. 1 at a frontal collision.
Figure 4:
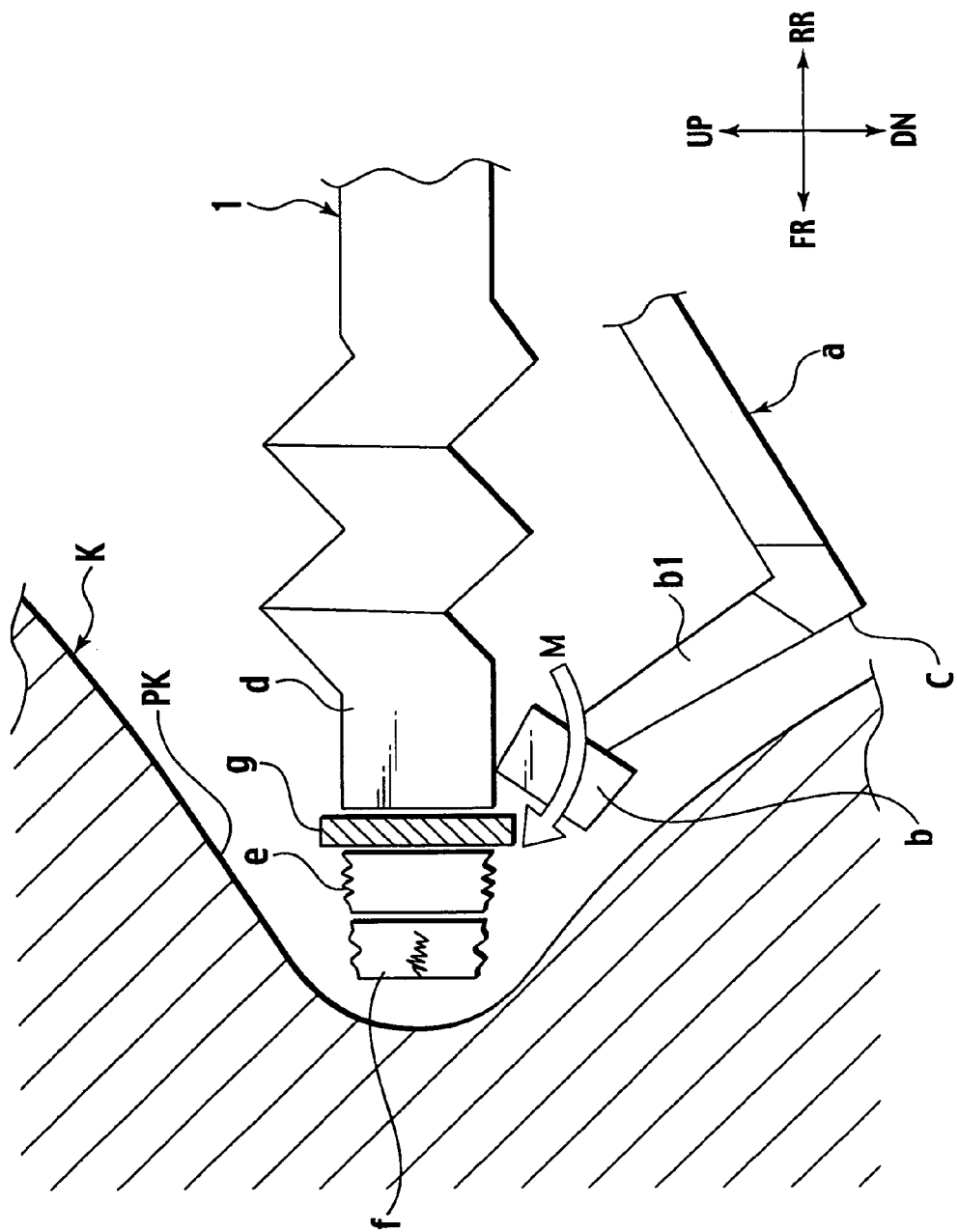
FIG. 4 is a side view showing deformation of a structural member of a vehicle front body of a comparative example at a frontal collision.

According to the vehicle front body structure of this embodiment, a collision load inputted from the front of the vehicle body at a frontal collision is transmitted from the bumper armature 5 through the bumper stay 4 to the side member 1, with the bumper stay 4 and the side member 1 being crushed and axially deformed, as shown in FIG. 3. The impact energy is absorbed by the deformation of the bumper armature 5 and the axial deformations of the bumper stay 4 and the side member 1.

With the side member 1 crushing, the bracket 6 fixed to the front end of the side member 1 is displaced to the rear in the vehicle body, and a part of the collision load is transmitted to the suspension member 3.

At this time of the collision, the suspension member 3 is pushed forward, receiving an inertia force of the vehicle body from the rear, while the downward projecting portion 6b of the bracket 6 which is located in front of the front mounting portion 3a thereof is displaced to the rear. When the front mounting portion 3a thereof comes into contact with the downward projecting portion 6b of the bracket 6, the forward displacement of the front mounting portion 3a is prevented. Since the front side face 3a1 of the front mounting portion 3a is formed to be substantially parallel with the rear side face 6e of the downward projecting portion 6b and the lower end of the front side face 3a1 is positioned higher than the lower end of the rear side face 6e of the downward projecting portion 6b, generation of a moment at the suspension member 3 with the front mounting portion 3a as the fulcrum is effectively prevented.

Therefore, the collision load on the suspension member 3 acts in the axial direction thereof. The suspension member 3 can be crushed in the axial direction (crushed portion R) without breakage, whereby a reaction force against the collision load is increased and the efficiency of the impact energy absorption is improved.

Also, since the side member 1 has an expanded collision load receiving face formed by the upward projecting portion 6a and downward projecting portion 6b of the bracket 6, a flat portion can be made in the front face Pk of the object K. Therefore, the collision load can be distributed uniformly, whereby the compatibility can be improved.

Moreover, since the radiator core support 2 has the opening 2d formed at the portion corresponding to the front end plate 1a of the side member 1 and the bumper stay 4 is directly connected to the front end of the side member 1 passing through the opening 2d, the collision load is transmitted from the bumper armature 5 through the bumper stay 4 directly to the side member 1, and is not directly transmitted to the radiator core support 2. Therefore, damage on the radiator core support 2 at a collision can be minimized.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2004-111969, filed on Apr. 6, 2004, the disclosure of which is expressly incorporated herein by reference in its entirety.

What is claimed is:

1. A vehicle front body structure comprising:
  a longitudinal structural member provided with bracket structure at a front end thereof, the bracket structure having an upward projecting portion projecting upward from an upper side face of the longitudinal structural member and a downward projection portion projecting downward from a lower side face of the longitudinal structural member;
  a radiator core support for supporting a radiator, the radiator core support being connected to the longitudinal structural member via the upward projecting portion and the downward projecting portion of the bracket structure thereof; and
  a suspension member mounted to the longitudinal structural member with a front portion thereof fixed to the lower side face of the longitudinal structural member at a position in the vicinity of a rear side face of the downward projecting portion of the bracket structure.

2. A vehicle front body structure in claim 1, wherein a stay of a bumper armature arranged in front of the radiator core support is directly connected to the front end of the longitudinal structural member.

3. A vehicle front body structure in claim 2, wherein the radiator core support is configured to be indirectly connected to the stay.

4. A vehicle front body structure in claim 3, wherein the radiator core support has an opening to expose the front face of the front end of the longitudinal structural member, and the stay is connected to the longitudinal structural member through the opening.

5. A vehicle front body structure in claim 1, wherein a lower end of the downward projecting portion of the bracket structure is positioned lower than a lower end of the front portion of the suspension member.

6. A vehicle front body structure comprising:

a longitudinal structural member provided with bracket structure at a front end thereof, the bracket structure having an upward projecting portion projecting upward from an upper side face of the longitudinal structural member and a downward projecting portion projecting downward from a lower side face of the longitudinal structural member;

a radiator core support for supporting a radiator, the radiator core support being connected to the longitudinal structural member via the upward projecting portion and the downward projecting portion of the bracket structure thereof;

a suspension member mounted to the longitudinal structural member with a front portion thereof fixed to the lower side face of the longitudinal structural member at a position in the vicinity of a rear side face of the downward projecting portion of the bracket structure;

a bumper armature arranged in front of the radiator core support; and a stay of the bumper armature extending rearward from the bumper armature, wherein the radiator core support is formed to have an opening at a portion corresponding to the front end of the longitudinal structural member, and the stay is directly connected to the front end of the longitudinal structural member through the opening.

* * * * *